Figures 1, 2, 3:
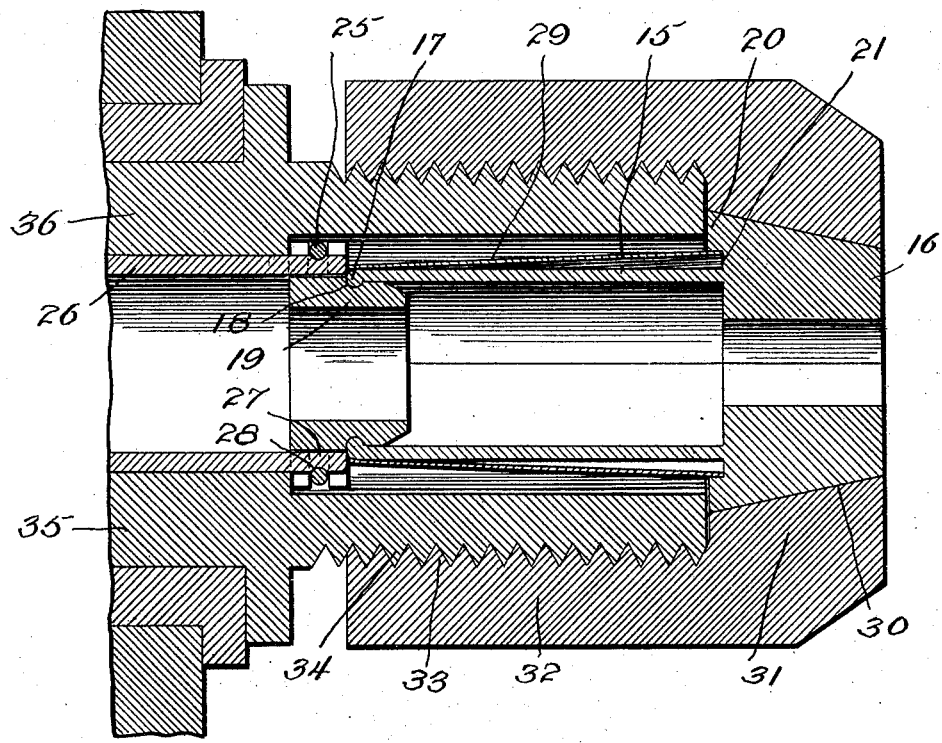

E. A. CLARK.
CHUCK.
APPLICATION FILED JUNE 8, 1910.

986,689.

Patented Mar. 14, 1911.

2 SHEETS—SHEET 1.

WITNESSES

INVENTOR
E. A. Clark,

BY

Attorney

E. A. CLARK.
CHUCK.
APPLICATION FILED JUNE 8, 1910.

986,689.

Patented Mar. 14, 1911.
2 SHEETS—SHEET 2.

WITNESSES:

BY

INVENTOR
E. A. Clark,

Attorney

UNITED STATES PATENT OFFICE.

EDWIN A. CLARK, OF TOPEKA, KANSAS.

CHUCK.

986,689.  Specification of Letters Patent.  Patented Mar. 14, 1911.

Application filed June 8, 1910. Serial No. 565,741.

*To all whom it may concern:*

Be it known that I, EDWIN A. CLARK, a citizen of the United States, and residing at Topeka, in the county of Shawnee and State of Kansas, have invented certain new and useful Improvements in Chucks, of which the following is a specification.

This invention relates to an axially thrust chuck for metal-working lathes or for other metal-working machines wherein it is found applicable to use a chuck in accordance with this invention and the invention has for its object to provide a chuck in a manner as hereinafter set forth which is capable of use within a wide latitude for work of different diameters and whereby the work will be fixedly secured in position with respect to a rotating means therefor when a tool is operated to perform its function on the work.

A further object of the invention is to provide a chuck with a pivoted body-portion formed entirely of a series of independent pivoted sections each provided with a clamping jaw for gripping the work when the jaws are moved toward each other and by such arrangement the breaking of the body-portion is reduced to a minimum, consequently obtaining a saving in expense over the employment of the axially thrust chucks now in general use comprising a rigid one-piece body-portion. Such forms of chucks as is well known are objectionable as they are liable to break at the body portion, due to the thrust, and which destroys the usefulness of the chuck and furthermore makes their use an expensive one but by setting up the body-portion of independent pivoted sections, breakage as before stated, is reduced to a minimum.

A further object of the invention is to provide a chuck of the axially thrust class with a body-portion formed of a plurality of pivoted clamping elements for fixedly securing the work in position while a tool is performing its function and to further provide the chuck with means in a manner as hereinafter set forth which surrounds and engages simultaneously the elements of the body-portion for automatically projecting the elements in a direction away from each other when the thrust upon the chuck is discontinued whereby the work can be conveniently removed from the chuck when occasion so requires without discontinuing the operation of the lathe.

A further object of the invention is to provide a chuck of the axially thrust class embodying a head provided with means in a manner as hereinafter set forth for detachably-connecting the head with a mechanical or fluid pressure operated thrust spindle and to further provide the chuck with a body-portion formed of a plurality of independent sections, each having a gripping jaw and each of which is detachably-connected to and pivoted upon the head whereby breakage of the body-portion is reduced to a minimum during the employment of the chuck.

Further objects of the invention are to provide a tool chuck of the axially thrust class which shall be comparatively simple in its construction and arrangement, formed of a plurality of independent elements capable of being conveniently assembled together for operative purposes, strong, durable, efficient in its use and reducing breakage of the chuck to a minimum thereby obtaining a saving in expense and comparatively inexpensive to manufacture.

With the foregoing and other objects in view, the invention consists of the novel construction, combination and arrangement of parts as hereinafter more specifically described and illustrated in the accompanying drawings, wherein is shown one embodiment of the invention, but it is to be understood that changes, variations and modifications can be resorted to which come within the scope of the claims hereunto appended.

Figure 4:
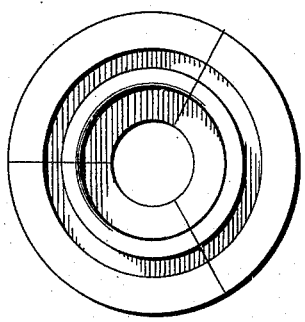
Figure 5:
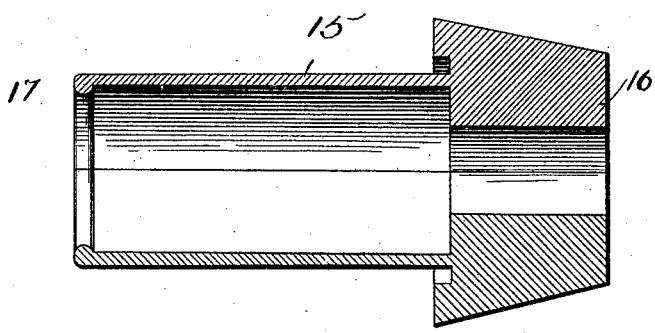
Figure 6:
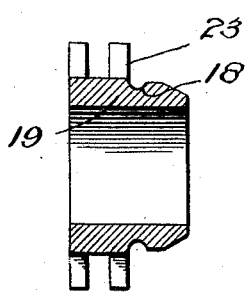
Figure 7:
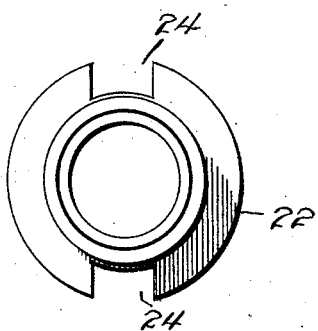
Figure 8:
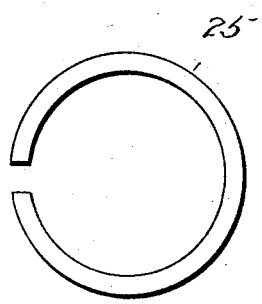
Figure 9:
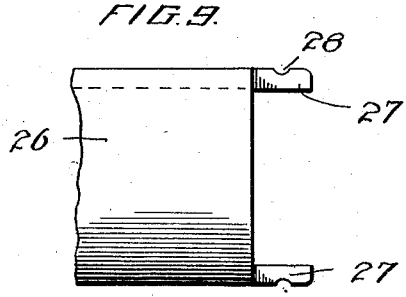
Figure 10:
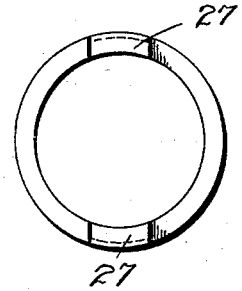

In describing the invention in detail, reference is had to the accompanying drawings wherein like characters of reference denote corresponding parts throughout the several views and in which:

Figure 1 is a longitudinal sectional view broken away showing the adaptation therewith of a chuck in accordance with this invention in connection with a thrust rod or spindle and further showing the chuck in clamping or gripping position. Fig. 2 is a side elevation and Fig. 3 an end view of the jaw spreading member. Fig. 4 is an end view of the body-portion of the chuck showing the same in operating or clamping position. Fig. 5 is an elevation of one of the sections of the body-portion. Fig. 6 is a longitudinal sectional view and Fig. 7 is an end view of the head of the chuck. Fig. 8 is a detail illustrating the clamping ring for the thrust rod or spindle. Fig. 9 is a longitudinal sectional view broken away of one end of the thrust rod or spindle, and, Fig. 10 is an end view of the thrust rod or spindle.

Referring to the drawings in detail, the body-portion of the chuck consists of a plurality of segment-shaped members 15, preferably three in number and each terminating approximately centrally in the inner end of a clamping or gripping jaw 16 which is segment-shaped in contour. The inner end of the member 15 is provided with an inwardly-extending bead or shoulder 17 which constitutes a fulcrum for its respective member 15 by engaging in an annular seat 18 formed in the periphery of the head 19 of the chuck. The inner end of each of the jaws 16 at its outer side is off-set rearwardly as at 20 so as to provide in connection with the forward end of the member 15 a pocket 21. The head 19 of the chuck is hollow and cylindrical in contour and the seat 18 is positioned intermediate the ends of the head 19 whereby when the members or sections 15 of the body-portion are connected to the head 19, the latter will project into the body-portion of the chuck. The head 19 of the chuck inwardly of the seat 18 is formed with a pair of peripheral flanges 22 and 23 which are spaced apart and which are cut-away at diametrically-opposite points to provide passages 24. Interposed between the flanges 22, 23 is a split clamping ring or band 25 for coupling the head to the thrust rod or spindle 26. By way of example, the thrust rod or spindle 26 is shown as having one end provided with a pair of outwardly-extending and diametrically opposed lugs 27 which are grooved in their outer faces as at 28 to receive the ring 25. The lugs 27 are adapted to extend through the passages 24 and force the ring or band 25 outwardly until the ring seats in the grooves 28 whereby the head will be detachably-connected to the thrust rod or spindle 26. It is obvious however, that the head of the chuck can be connected to the thrust rod or spindle 26 in any other manner if desired.

Surrounding the sections or members 15 of the body-portion is a split conoidal-shaped jaw spreading member 29 which has its smaller end abutting against the flange 23 and its other end extending in the pocket 21 and engaging the inner end of the jaws 16. This spreading member 29 constitutes a means for maintaining the members or sections 15 of the body-portion around the head 19 and furthermore constitutes a means to project the sections or members of the body-portion away from each other when pressure is removed from the thrust rod or spindle 26 or when the rod or spindle 26 is moved rearwardly.

The jaws 16 are moved to clamping position by the engaging thereof with the beveled inner face 30 of a master collet 31 which is carried by a sleeve 32 provided with interior threads 33 which engage with peripheral threads 34 formed on a sleeve 35 extending from the shaft 36 of the lathe. The collet 31 is arranged at the front of the sleeve 35 and the latter forms an abutment for the collar when the sleeve 32 is screwed home upon the sleeve 35. The sleeve 35 surrounds the head 19 and body-portion of the chuck. From the foregoing arrangement, it is obvious that when the rod or spindle 26 is moved forwardly, the jaws 16 riding against the beveled inner face of the collar 30 will be moved toward each other thereby clamping the work which is mounted in said jaws and storing tension in the member 29. When the thrust rod or spindle 26 is moved rearwardly, the jaws 16 are carried therewith and the member 29 allowed to expand whereby the jaws 16 are projected away from each other and the work can then be conveniently removed from the jaws. The removal of a finished piece of work and the positioning of a piece of work to be operated on can be had without discontinuing the operation of the lathe and by such arrangement a material saving in time is obtained.

What I claim is:

1. An axially thrust chuck comprising a head adapted to be connected to a thrust spindle, and a body-portion pivoting at one end upon said head and formed entirely of a plurality of independent sections each provided with a clamping jaw, and means abutting against the head and surrounding the body-portion and engaging the jaws for operating them when pressure upon the thrust spindle is relieved.

2. An axially thrust chuck comprising a body-portion formed of a series of segment-shaped sections, each provided at one end with a gripping jaw, a head adapted to be detachably-connected to a thrust spindle, means whereby each of said sections is pivotally and detachably-connected at one end upon said head, and a conoidal-shaped resilient split sleeve abutting against the head and engaging the jaws for spreading them apart when pressure is relieved upon the thrust spindle, said sleeve further constituting means for maintaining the sections of the body-portion around the head.

3. An axially thrust chuck comprising a pivoted body-portion formed of a plurality of independent sections each provided with a gripping jaw, a head extending in said body-portion and upon which the sections of the body-portion pivot, and a resilient sleeve surrounding the body-portion between the head and the jaws and contracting at its inner end for maintaining the sections of the body-portion upon the head and expanding at its outer end for spreading the jaws apart when pressure is relieved upon the head.

4. An axially thrust chuck comprising a pivoted body-portion formed of a plurality of independent sections each provided with a gripping jaw, a head extending in said body-portion and upon which the sections of the body-portion pivot, a resilient sleeve surrounding the body-portion between the head and the jaws and contracting it at its inner end for maintaining the sections of the body-portion upon the head and expanding at its outer end for spreading the jaws apart when pressure is relieved upon the head, and means whereby said head is detachably-connected to a thrust spindle.

In testimony whereof I affix my signature in presence of two witnesses.

EDWIN A. CLARK.

Witnesses:
I. G. CORBIN,
J. W. LIPPER.

Copies of this patent may be obtained for five cents each, by addressing the "Commissioner of Patents, Washington, D. C."